US012662571B2

(12) United States Patent
Wehrmann et al.

(10) Patent No.: US 12,662,571 B2
(45) Date of Patent: Jun. 23, 2026

(54) POLYCARBONATE COMPOSITIONS CONTAINING POLYETHERCARBONATE POLYOLS

(71) Applicant: Covestro Deutschland AG, Leverkusen (DE)

(72) Inventors: Rolf Wehrmann, Krefeld (DE); Anke Boumans, Bedburg-Hau (DE)

(73) Assignee: Covestro Deutschland AG, Leverkusen (DE)

( * ) Notice: Subject to any disclaimer, the term of this patent is extended or adjusted under 35 U.S.C. 154(b) by 724 days.

(21) Appl. No.: 17/919,400

(22) PCT Filed: May 20, 2021

(86) PCT No.: PCT/EP2021/063441
§ 371 (c)(1),
(2) Date: Oct. 17, 2022

(87) PCT Pub. No.: WO2021/239569
PCT Pub. Date: Dec. 2, 2021

(65) Prior Publication Data
US 2023/0151148 A1 May 18, 2023

(30) Foreign Application Priority Data
May 26, 2020 (EP) .................................... 20176390

(51) Int. Cl.

| | |
|---|---|
| ***C08G 64/06*** | (2006.01) |
| ***B29C 45/00*** | (2006.01) |
| ***C08G 64/18*** | (2006.01) |
| *B29K 69/00* | (2006.01) |
| *B29L 11/00* | (2006.01) |
| *B29L 31/30* | (2006.01) |
| *B29L 31/34* | (2006.01) |

(52) U.S. Cl.
CPC .......... *C08G 64/06* (2013.01); *B29C 45/0001* (2013.01); *C08G 64/183* (2013.01); *B29C 2945/76531* (2013.01); *B29K 2069/00* (2013.01); *B29K 2995/0026* (2013.01); *B29L 2011/0016* (2013.01); *B29L 2031/3055* (2013.01); *B29L 2031/3475* (2013.01); *C08G 2261/126* (2013.01)

(58) Field of Classification Search
CPC ............................. C08G 64/06; C08G 64/183; C08G 2261/126; B29C 45/0001; B29C 2945/76531; B29K 2069/00; B29K 2995/0026; B29L 2011/0016; B29L 2031/3055; B29L 2031/3475
See application file for complete search history.

(56) References Cited

U.S. PATENT DOCUMENTS

| | | | | |
|---|---|---|---|---|
| 2,991,273 | A | 7/1961 | Hechelhammer et al. | |
| 2,999,825 | A | 9/1961 | Floyd et al. | |
| 2,999,846 | A | 9/1961 | Schnell et al. | |
| 3,028,635 | A | 4/1962 | Herubel | |
| 3,148,172 | A | 9/1964 | Fox et al. | |
| 3,271,367 | A | 9/1966 | Schnell et al. | |
| 3,404,109 | A | 10/1968 | Milgrom | |
| 3,829,505 | A | 8/1974 | Herold | |
| 3,941,849 | A | 3/1976 | Herold | |
| 4,252,922 | A * | 2/1981 | Adelmann | C08L 69/00 525/462 |
| 4,982,014 | A | 1/1991 | Freitag | |
| 5,158,922 | A | 10/1992 | Hinney | |
| 5,470,813 | A | 11/1995 | Le-Khac | |
| 10,676,613 | B2 | 6/2020 | Heuer et al. | |
| 2011/0112240 | A1* | 5/2011 | Krauter | C08L 71/02 525/534 |
| 2014/0066535 | A1 | 3/2014 | Jacobs et al. | |
| 2015/0225503 | A1* | 8/2015 | Muller | C08G 64/34 528/371 |
| 2020/0087438 | A1 | 3/2020 | Hilken et al. | |

FOREIGN PATENT DOCUMENTS

| | | | |
|---|---|---|---|
| DE | 1570703 | | 2/1970 |
| DE | 2036052 | A1 | 1/1972 |
| DE | 2063050 | A1 | 7/1972 |
| DE | 2211956 | | 10/1973 |
| DE | 3832396 | A1 | 2/1990 |
| EP | 0004020 | A1 | 9/1979 |
| EP | 0222453 | B1 | 3/1993 |
| EP | 0700949 | B1 | 3/1996 |
| EP | 0743093 | B1 | 12/2001 |
| EP | 0761708 | B1 | 3/2003 |
| EP | 1359177 | A1 | 11/2003 |

(Continued)

OTHER PUBLICATIONS

Freitag et al., Bayer AG, Polycarbonates, Encyclopedia of Polymer Science and Engineering, 1998, p. 648-718, vol. 11, Second Edition.

(Continued)

*Primary Examiner* — Jiangtian Xu

(74) *Attorney, Agent, or Firm* — John E. Mrozinski, Jr.; Richard P. Bender

(57) ABSTRACT

Polycarbonate-based compositions containing polyether carbonate polyol are described. The compositions have an elevated transmittance in the VIS range as a result of the additive and further advantageous properties, for instance improved demolding characteristics. Even small amounts have a significant impact.

19 Claims, No Drawings

(56) References Cited

FOREIGN PATENT DOCUMENTS

| | | | |
|---|---|---|---|
| EP | 2115032 | A1 | 11/2009 |
| EP | 2530101 | A1 | 12/2012 |
| EP | 3027673 | A1 | 6/2016 |
| EP | 3771724 | A1 | 2/2021 |
| FR | 1561518 | | 2/1969 |
| GB | 1122003 | | 7/1968 |
| GB | 1229482 | | 4/1971 |
| GB | 1367790 | | 9/1974 |
| JP | S6162039 | A | 3/1986 |
| JP | S6162040 | A | 3/1986 |
| JP | S61105550 | A | 5/1986 |
| JP | S6236457 | A | 2/1987 |
| WO | 9740086 | A1 | 10/1997 |
| WO | 9816310 | A1 | 4/1998 |
| WO | 0047649 | A1 | 8/2000 |
| WO | 2008093731 | A1 | 8/2008 |
| WO | 2012130760 | A1 | 10/2012 |
| WO | 2015135958 | A1 | 9/2015 |
| WO | 2017178583 | A1 | 10/2017 |
| WO | 2018073313 | A1 | 4/2018 |
| WO | 2018219893 | A1 | 12/2018 |

OTHER PUBLICATIONS

Grigo et al., Polycarbonate, Engineering Thermoplastics, Polycarbonate, Polyacetale, Polyester, Celluloseester, Kunststoff-Handbuch, Mar. 1, 1992, p. 117-299, Becker/Braun.

Schnell, Chemistry and Physics of Polycarbonates, 1964, vol. 9, Interscience Publishers, Germany.

* cited by examiner

POLYCARBONATE COMPOSITIONS CONTAINING POLYETHERCARBONATE POLYOLS

CROSS-REFERENCE TO RELATED APPLICATIONS

This application is the United States national phase of International Application No. PCT/EP2021/063441 filed May 20, 2021, and claims priority to European Patent Application No. 20176390.1 filed May 26, 2020, the disclosures of which are hereby incorporated by reference in their entirety.

BACKGROUND OF THE INVENTION

Field of the Invention

The invention relates to compositions containing aromatic polycarbonate and polyether carbonate polyols and to moldings obtainable therefrom. The compositions have improved rheological and optical properties, and improved demolding and processing characteristics in injection molding.

Description of Related Art

Particularly in the case of thin-walled transparent (housing) parts, for example diffuser sheets in ultrabooks, smartphones or smartbooks, a low melt viscosity is required in order that components having a uniform wall thickness can be achieved. Further fields of application in which good flowabilities are required are in the automotive sector (for example headlamp covers, visors, optical fibre systems), in the electrics and electronics sector (lighting components, housing parts, covers, smart meter applications).

Bisphenol A diphosphate (BDP) is conventionally used for flow improvement, in amounts of up to more than 10% by weight in order to achieve the desired effect. However, this markedly reduces heat resistance. This effect is described, for example, in WO 2015/135958 A1.

There is moreover a need, in particular for the abovementioned components, to further improve transmittance in order to utilize the energy employed for the respective application as well as possible. Further optical properties, such as yellowness index (Y.I.) and the haze of the material, should ideally also be improved. Heat resistance should not be significantly affected, rather Vicat temperatures should preferably remain at at least 135.0° C.

A solution in the prior art, described in WO 2017/178583 A1, provides for adding compositions composed of polycarbonate isosorbide ester. A disadvantage of this solution is the very high volatility of the isosorbide esters, which can lead to undesirable formation of deposits in injection molding.

SUMMARY OF THE INVENTION

It is accordingly an object of the invention to provide polycarbonate-based compositions retaining good heat resistance, i.e. Vicat temperatures of ideally at least 135° C., preferably at least 140° C., which exhibit improved optical properties, i.e. a higher transmittance Ty, a lower yellowness index and the lowest possible haze, while simultaneously exhibiting improved flowability, ideally also coupled with improved demolding and processing characteristics.

It has surprisingly been found that polycarbonate compositions exhibit better optical properties, i.e. a higher transmittance in the VIS range and also a lower yellowness index relative to non-additized compositions when polyether carbonate polyols are added. Heat resistance, determined via the Vicat temperature, remains approximately the same if the amounts of the additive are not excessive, and remains at an acceptable level at higher concentrations of polyether carbonate polyols. At the same time, the coefficient of dynamic and static friction is reduced, which means better demolding and processing characteristics in injection molding.

Polyether carbonate polyols are known in principle. Polyether carbonate polyols are typically produced by catalytic reaction of alkylene oxides (epoxides) and carbon dioxide in the presence of H-functional starter compounds ("starters"). This reaction is shown in schematic form in scheme (I), where R is an organic radical such as alkyl, alkylaryl or aryl, each of which may also contain heteroatoms, for example O, S, Si, etc., and where e, f and g are integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary and is not restricted to the polyether carbonate polyol shown in scheme (I). This reaction (see scheme (I)) is highly advantageous from an environmental standpoint since this reaction comprises converting a greenhouse gas such as $CO_2$ into a polymer. A further product formed, actually a by-product, is the cyclic carbonate shown in scheme (1) (for example propylene carbonate when R=$CH_3$, also referred to hereinafter as cPC, or ethylene carbonate when R=H, also referred to hereinafter as cEC).

(1)

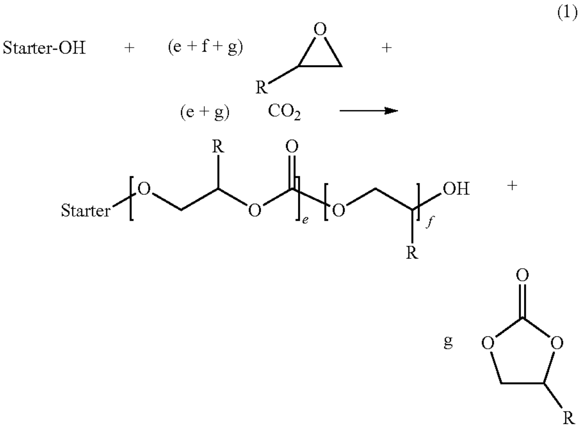

A process for producing polyether carbonate polyols is described, for example, in EP 2 530 101 A1, in EP 3 027 673 B1 or in the European patent application having application Ser. No. 19/189,265.2. The European patent application having application number 19189265.2 describes a process for producing polyether carbonate polyols having a very low content of cyclic polycarbonate, and production of polyether carbonate polyols for compositions according to the invention by this process is therefore preferred. The use of polyether carbonate polyols together with isocyanates for production of polyurethane foams is known and described, for example, in WO 2012/130760 A1, EP 0 222 453 A2 or WO 2018/219893 A1. However, use as an additive for polycarbonate compositions is not described.

The polycarbonate compositions according to the invention containing polyether carbonate polyols show improved optical properties measurable by a higher optical transmittance (transmittance in the VIS range, Ty, light type D65), determined according to ISO 13468-2:2006 at a thickness of 4 mm, preferably also a lower yellowness index (YI), determined according to ASTM E 313-15 (observer 10°/illuminant: D65) on specimen plaques having a layer thickness of 4 mm compared to corresponding compositions which otherwise contain the same components in addition to polycarbonate in the same amounts except for the polyether carbonate polyols. In addition, the compositions show good melt stabilities with improved rheological properties, namely a higher melt volume flow rate (MVR) determined according to DIN EN ISO 1133:2012-3 (at a test temperature of 300° C., mass 1.2 kg), an improved melt viscosity, determined according to ISO 11443:2005, and good demolding properties.

DETAILED DESCRIPTION

The present invention accordingly provides compositions containing

A) aromatic polycarbonate and

B) polyether carbonate polyol.

“Transparent” in the context of the invention means that the compositions have a visual transmittance Ty (D65 observed at 10°) of at least 84%, preferably of at least 88%, particularly preferably of at least 88.5%, very particularly preferably of at least 89.0%, determined according to ISO 13468-2:2006 at a thickness of 4 mm, and a haze of <5%, preferably <2%, particularly preferably <1.5%, very particularly preferably <1.0%, determined according to ASTM D1003:2013 at a layer thickness of 4 mm.

The compositions preferably contain

A) 70.0% by weight to 99.95% by weight of aromatic polycarbonate and

B) 0.05% to 2.0% by weight of polyether carbonate polyol.

The compositions according to the invention more preferably contain

A) 80.0% by weight to 99.9% by weight of aromatic polycarbonate and

B) 0.1% by weight to 1.2% by weight of polyether carbonate polyol,

C) 0% to 1.0% by weight of at least one heat stabilizer and/or transesterification stabilizer, D) 0% to 1.0% by weight of at least one UV absorber and E) optionally one or more further additives distinct from components B, C and D.

Such compositions particularly preferably consist of

A) 95.0% by weight to 99.9% by weight of aromatic polycarbonate and

B) 0.1% to 1.2% of polyether carbonate polyol,

C) 0% to 1.0% by weight of at least one heat stabilizer and/or transesterification stabilizer, D) 0% to 1.0% by weight of at least one UV absorber and E) optionally one or more further additives, wherein the further additives are selected from the group consisting of antioxidants, demolding agents, flame retardants, IR absorbers, antistats, optical brighteners, colorants such as organic dyes and/or additives for laser marking and F) optionally blend partners.

In the description of the invention which follows, $C_1$- to $C_4$-alkyl in the context of the invention is, for example, methyl, ethyl, n-propyl, isopropyl, n-butyl, sec-butyl, tert-butyl, and $C_1$- to $C_6$-alkyl is additionally for example n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,3-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl. $C_1$- to $C_{10}$-alkyl is additionally for example n-heptyl and n-octyl, pinacyl, adamantyl, the isomeric menthyls, n-nonyl, n-decyl. $C_1$- to $C_{34}$-alkyl is additionally for example n-dodecyl, n-tridecyl, n-tetradecyl, n-hexadecyl or n-octadecyl. The same applies for the corresponding alkyl radical for example in aralkyl/alkylaryl, alkylphenyl or alkylcarbonyl radicals. Alkylene radicals in the corresponding hydroxyalkyl or aralkyl/alkylaryl radicals are for example the alkylene radicals corresponding to the preceding alkyl radicals.

Aryl is a carbocyclic aromatic radical having 6 to 34 skeletal carbon atoms. The same applies to the aromatic moiety of an arylalkyl radical, also known as an aralkyl radical, and to aryl constituents of more complex groups, for example arylcarbonyl radicals.

Examples of $C_6$- to $C_{34}$-aryl are phenyl, o-, p-, m-tolyl, naphthyl, phenanthrenyl, anthracenyl and fluorenyl.

Arylalkyl and aralkyl are each independently a straight-chain, cyclic, branched or unbranched alkyl radical as defined above, which may be mono-, poly- or persubstituted by aryl radicals as defined above.

In the context of the present invention—unless explicitly stated otherwise—the reported % by weight values for the components A, B, C, D and E are each based on the total weight of the composition. In addition to components A, B, C and D the composition may contain further components—further additives of component E and/or blend partners. In a preferred embodiment, the composition contains no further components, but rather the aforementioned components, more preferably components A, B and optionally C, optionally D and optionally E, particularly preferably components A to D, sum to 100% by weight-%; i.e. the composition consists of these components.

The compositions according to the invention are preferably used for producing moldings. The compositions preferably have a melt volume flow rate (MVR) of 2 to 75 $cm^3/(10\ min)$, more preferably of 3 to 65 $cm^3/(10\ min)$, particularly preferably of 6 to 35 $cm^3/(10\ min)$, determined according to ISO 1133:2012-3 (test temperature 300° C., mass 1.2 kg).

The individual constituents of the compositions according to the invention are more particularly elucidated hereinbelow:

Component A

In the context of the invention, the term “polycarbonate” is understood to mean both homopolycarbonates and copolycarbonates. The polycarbonates may be linear or branched in the known manner. Also employable according to the invention are mixtures of polycarbonates.

The composition according to the invention preferably contains as component A 20.0% by weight to 99.95% by weight, preferably up to 99.9% by weight, in particular up to 99.8% by weight, of aromatic polycarbonate. The amount of the aromatic polycarbonate in the composition is preferably at least 70% by weight, more preferably at least 75% by weight and yet more preferably at least 80% by weight, particularly preferably at least 87% by weight, very particularly preferably at least 95.0% by weight, wherein a single polycarbonate or a mixture of two or more polycarbonates may be present. The thermoplastic composition is therefore preferably "based" on aromatic polycarbonate, wherein the aforementioned definitions from "at least 70% by weight of polycarbonate mean "based on polycarbonate".

The polycarbonates present in the compositions are produced in a known manner from dihydroxyaryl compounds, carbonic acid derivatives, and optionally chain terminators and branching agents.

Details of the production of polycarbonates have been set out in many patent specifications over the past 40 years or so. Reference may be made here for example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718, and lastly to U. Grigo, K. Kirchner and P. R. Müller "Polycarbonate" [Polycarbonates] in Becker/Braun, Kunststoff-Handbuch [Plastics Handbook], Volume 3/1, Polycarbonate, Polyacetale, Polyester, Celluloseester [Polycarbonates, polyacetals, polyesters, cellulose esters], Carl Hanser Verlag Munich, Vienna 1992, pages 117 to 299.

Aromatic polycarbonates are produced, for example, by reaction of dihydroxyaryl compounds with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of dihydroxyaryl compounds with, for example, diphenyl carbonate is likewise possible.

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulfides, bis (hydroxyphenyl) ethers, bis(hydroxyphenyl) ketones, bis (hydroxyphenyl) sulfones, bis(hydroxyphenyl) sulfoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

(I)

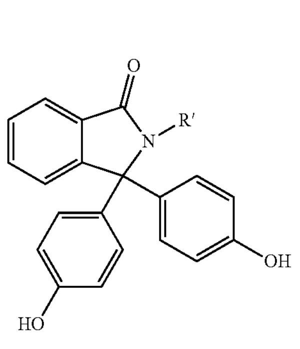

-continued (II)

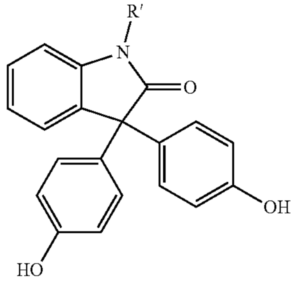

(III)

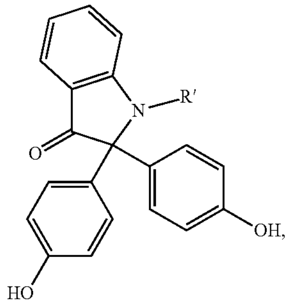

in which R' in each case represents $C_1$- to $C_4$-alkyl, aralkyl or aryl, preferably methyl or phenyl, very particularly preferably methyl.

Particularly preferred bisphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane, 4,4'-dihydroxydiphenyl and dimethylbisphenol A, and also the bisphenols of formulae (I), (II) and (III).

These and other suitable dihydroxyaryl compounds are described by way of example in U.S. Pat. Nos. 3,028,635 A, 2,999,825 A, 3,148,172 A, 2,991,273 A, 3,271,367 A, 4,982,014 A and 2,999,846 A, in DE 1 570 703 A, DE 2063 050 A, DE 2 036 052 A, DE 2 211 956 A and DE 3 832 396 A, in FR 1 561 518 A, in the monograph "H. Schnell, Chemistry and Physics of Polycarbonates, Interscience Publishers, New York 1964" and also in JP 62039/1986 A, JP 62040/1986 A and JP 105550/1986 A.

In the case of homopolycarbonates only one dihydroxyaryl compound is used; in the case of copolycarbonates two or more dihydroxyaryl compounds are used.

Examples of suitable carbonic acid derivatives are phosgene or diphenyl carbonate.

Suitable chain terminators that may be employed in the production of the polycarbonates are monophenols. Examples of suitable monophenols include phenol itself, alkylphenols such as cresols, p-tert-butylphenol, cumylphenol, and also mixtures thereof.

Preferred chain terminators are phenols which are mono or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

The amount of chain terminator to be employed is preferably 0.1 to 5 mol % based on moles of diphenols employed in each case. The chain terminators may be added before, during or after the reaction with a carbonic acid derivative.

Suitable branching agents are the trifunctional or more than trifunctional compounds known in polycarbonate chemistry, in particular those having three or more than three phenolic OH groups.

Examples of suitable branching agents are 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane, 1,4-bis ((4',4"-dihydroxytriphenyl)methyl)benzene, and 3,3-bis(3-methyl-4-hydroxyphenyl)-2-oxo-2,3-dihydroindole.

The amount of any branching agents to be used is preferably 0.05 mol % to 2.00 mol %, based on moles of dihydroxyaryl compounds used in each case.

The branching agents can either form an initial charge with the dihydroxyaryl compounds and the chain terminators in the aqueous alkaline phase or can be added, dissolved in an organic solvent, before the phosgenation. In the case of the transesterification method, the branching agents are used together with the dihydroxyaryl compounds.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and also homo- or copolycarbonates derived from the dihydroxyalkyl compounds of formulae (I), (II) and (III)

(I)

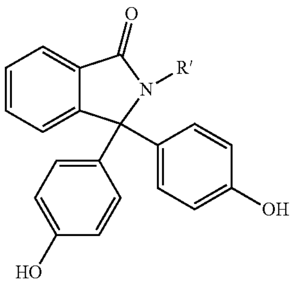

(II)

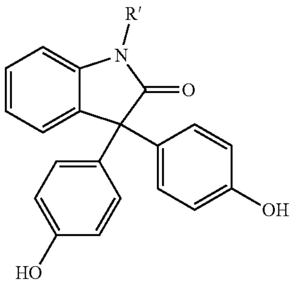

(III)

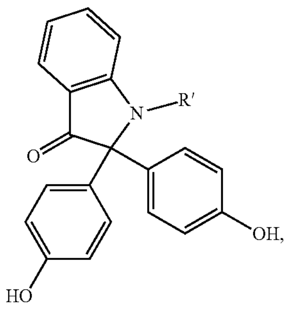

in which each R' is $C_1$- to $C_4$-alkyl, aralkyl or aryl, preferably methyl or phenyl, very particularly preferably methyl.

To achieve incorporation of additives, component A is preferably employed in the form of powders, pellets or mixtures of powders and pellets.

The polycarbonate used may also be a mixture of different polycarbonates, for example of polycarbonates A1 and A2:

The amount of the aromatic polycarbonate A1, based on the total amount of polycarbonate, is preferably 80.0% to 94.0% by weight, more preferably 83.0% to 93.5% by weight, particularly preferably 84.0% to 93.2% by weight, where this aromatic polycarbonate is based on bisphenol A with a preferred melt volume flow rate MVR of 7 to 15 $cm^3$/10 min, more preferably with a melt volume flow rate MVR of 8 to 12 $cm^3$/10 min and particularly preferably with a melt volume flow rate MVR of 8 to 11 $cm^3$/10 min, determined in accordance with ISO 1133 (testing temperature 300° C., mass 1.2 kg).

The amount of the pulverulent aromatic polycarbonate A2, based on the total amount of polycarbonate, is preferably 6.0% to 20.0% by weight, more preferably 6.5% to 17.0% by weight, particularly preferably 6.8% to 16.0% by weight, where this aromatic polycarbonate is preferably based on bisphenol A with a preferred melt volume flow rate MVR of 4 to 24 $cm^3$/10 min, more preferably with a melt volume flow rate MVR of 5 to 22 $cm^3$/10 min and particularly preferably with a melt volume flow rate MVR of 6 to 20 $cm^3$/10 min, determined in accordance with ISO 1133 (testing temperature 300° C., mass 1.2 kg).

Component B

Component B in the compositions according to the invention is selected from one or more polyether carbonate polyols.

Component B preferably comprises a polyether carbonate polyol having a hydroxyl number (OH number) according to DIN 53240-1:2013-06 of ≥20 mg KOH/g to ≤120 mg KOH/g, more preferably of ≥20 mg KOH/g to ≤100 mg KOH/g, particularly preferably of ≥25 mg KOH/g to ≤90 mg KOH/g, which is in particular obtainable by copolymerization of carbon dioxide and one or more alkylene oxides in the presence of one or more H-functional starter molecules, wherein the polyether carbonate polyol preferably has a $CO_2$ content from of 10% to 25% by weight, more preferably 12% to 20% by weight, yet more preferably up to 19% by weight.

Component B preferably comprises a polyether carbonate polyol obtainable by copolymerization of ≥2% by weight to ≤30% by weight of carbon dioxide and >70% by weight to ≤98% by weight of one or more alkylene oxides in the presence of one or more H-functional starter molecules. The polyether carbonate polyols have for example a functionality of 1 to 8, preferably of ≥1 to ≤6, more preferably of ≥1 to ≤4, particularly preferably of ≥2 to ≤3. For the purposes of the invention, the expression "H-functional" refers to a starter compound which has hydrogen atoms which are active in respect of alkoxylation.

The copolymerization of carbon dioxide and one or more alkylene oxides is preferably effected in the presence of at least one DMC catalyst (double metal cyanide catalyst).

The polyether carbonate polyols used according to the invention preferably also comprise ether groups between the carbonate groups as shown schematically in formula (IV). In the scheme according to formula (IV), R is an organic radical such as alkyl, alkylaryl or aryl which can in each case also contain heteroatoms such as O, S, Si, etc.; e and f are each an integer. The polyether carbonate polyol shown in the scheme according to formula (IV) should be understood as meaning merely that blocks having the structure shown may in principle be present in the polyether carbonate polyol, but the sequence, number and length of the blocks may vary and is not restricted to the polyether carbonate polyol shown in formula (IV). In the case of formula (IV), this means that the ratio of e/f is preferably from 2:1 to 1:20, particularly preferably of 1.5:1 to 1:10.

(IV)

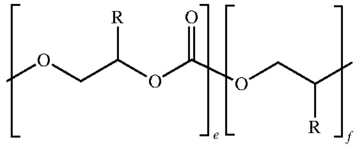

The proportion of incorporated $CO_2$ (“units deriving from carbon dioxide”; “$CO_2$ content”) in a polyether carbonate polyol may be determined from the evaluation of characteristic signals in the $^1$H NMR spectrum. The example which follows illustrates the determination of the proportion of units originating from carbon dioxide in an octane-1,8-diol-started $CO_2$/propylene oxide polyether carbonate polyol.

The proportion of incorporated $CO_2$ in a polyether carbonate polyol and the ratio of propylene carbonate to polyether carbonate polyol may be determined by $^1$H NMR (a suitable instrument is the DPX 400 instrument from Bruker, 400 MHz; pulse program zg30, delay time dl: 10 s, 64 scans). Each sample is dissolved in deuterated chloroform. The relevant resonances in the $^1$H NMR (based on TMS=0 ppm) are as follows: Cyclic propylene carbonate (which was formed as a by-product) with a resonance at 4.5 ppm; carbonate resulting from carbon dioxide incorporated in the polyether carbonate polyol with resonances at 5.1 to 4.8 ppm; unreacted propylene oxide (PO) with a resonance at 2.4 ppm; polyether polyol (i.e. without incorporated carbon dioxide) with resonances at 1.2 to 1.0 ppm; the octane-1,8-diol incorporated as starter molecule (if present) with a resonance at 1.6 to 1.52 ppm.

The proportion by weight (in % by weight) of polyether carbonate polyol-bonded carbonate (LC') in the reaction mixture was calculated according to formula (V), $$LC' = \frac{[F(5.1-4.8) - F(4.5)] * 102}{N} * 100\% \quad (V)$$

wherein the value of N (“denominator” N) is calculated according to formula (VI):

$$N = [F(5,1-4,8) - F(4,5)] * 102 + F(4,5) * 102 + F(2,4) * 58 + 0,33 * F(1,2-1,0) * 58 + 0,25 * F(1,6-1,52) * 146 \quad (VI)$$

The following abbreviations are used here:

A(4.5)=area of the resonance at 4.5 ppm for cyclic carbonate (corresponds to one hydrogen atom)

A(5.1–4.8)=area of the resonance at 5.1–4.8 ppm for polyether carbonate polyol and one hydrogen atom for cyclic carbonate A(2.4)=area of the resonance at 2.4 ppm for free, unreacted PO A(1.2–1.0)=area of the resonance at 1.2–1.0 ppm for polyether polyol A(1.6–1.52)=area of the resonance at 1.6 to 1.52 ppm for octane-1,8-diol (starter), if present.

The factor of 102 results from the sum of the molar masses of $CO_2$ (molar mass 44 g/mol) and of propylene oxide (molar mass 58 g/mol), the factor of 58 results from the molar mass of propylene oxide, and the factor of 146 results from the molar mass of the octane-1,8-diol starter used (if present).

The weight fraction (in % by weight) of cyclic carbonate (CC') in the reaction mixture may be calculated according to formula (VII), $$CC' = \frac{F(4.5) * 102}{N} * 100\%, \quad (VII)$$

wherein the value of N is calculated according to formula (VI).

In order to calculate the composition based on the polymer component (consisting of polyether polyol formed from starter and propylene oxide during the activation steps that take place in the absence of $CO_2$ and polyether carbonate polyol formed from starter, propylene oxide, and carbon dioxide during the activation steps that take place in the presence of $CO_2$ and during the copolymerization) from the values for the composition of the reaction mixture, the nonpolymeric constituents of the reaction mixture (i.e. cyclic propylene carbonate and any unreacted propylene oxide present) were mathematically eliminated. The weight fraction of carbonate repeating units in the polyether carbonate polyol was converted to a weight fraction of carbon dioxide using the factor F=44/(44+58), wherein 44 g/mol is the molar mass of carbon dioxide and 58 g/mol is the molar mass of propylene oxide. The value for the $CO_2$ content in the polyether carbonate polyol is normalized to the proportion of the polyether carbonate polyol molecule which was formed in the copolymerization and in any activation steps in the presence of $CO_2$ (i.e. the proportion of the polyether carbonate polyol molecule resulting from the starter (octane-1,8-diol, if present) and from the reaction of the starter with epoxide which was added under $CO_2$-free conditions was not taken into account here).

The polyether carbonate polyol is preferably a polyether carbonate polyol having a $CO_2$ content of 10% by weight to 25% by weight.

Production of polyether carbonate polyols of component B is carried out for example by:

(α) initially charging an H-functional starter compound or a mixture of at least two H-functional starter compounds and optionally removing water and/or other volatile compounds by means of elevated temperature and/or reduced pressure (“drying”), wherein the DMC catalyst is added to the H-functional starter compound or to the mixture of at least two H-functional starter compounds before or after drying, (β) adding a portion (based on the total amount of alkylene oxides used in the activation and copolymerization) of one or more alkylene oxides to the mixture resulting from step (α) to achieve activation, where this portion of alkylene oxide may optionally be added in the presence of $CO_2$ and where the temperature spike (“hotspot”) which then occurs due to the exothermic chemical reaction that follows and/or a pressure drop in the reactor is awaited in each case, and where step (β) for activation may also be repeated, (γ) adding one or more of the alkylene oxides and carbon dioxide to the mixture resulting from step (β), wherein the alkylene oxides used in step (β) may be identical or different to the alkylene oxides used in step (γ), Production of the polyether carbonate polyols may generally be achieved using alkylene oxides (epoxides) having 2 to 24 carbon atoms. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The alkylene oxides used are preferably ethylene oxide and/or propylene oxide and/or 1,2-butylene oxide, particularly preferably propylene oxide.

In a preferred embodiment of the invention, the proportion of ethylene oxide in the altogether employed amount of propylene oxide and ethylene oxide is ≥0 and ≤90% by weight, preferably ≥0% and ≤50% by weight and particularly preferably no ethylene oxide is employed.

Suitable H-functional starter compounds that may be employed include compounds having alkoxylationactive H atoms. Groups active in respect of the alkoxylation and having active hydrogen atoms are, for example, —OH, —$NH_2$ (primary amines), —NH— (secondary amines), —SH and —$CO_2H$, preferably —OH and —$NH_2$, particularly preferably —OH. Employed H-functional starter compounds include for example, one or more compounds selected from the group consisting of water, mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$-alkyl fatty acid esters containing an average of at least 2 OH groups per molecule. The $C_1$- to $C_{24}$-alkyl fatty acid esters which contain on average at least 2 OH groups per molecule are, for example, commercial products such as Lupranol Balance® (BASF AG), Merginol® products (Hobum Oleo-chemicals GmbH), Sovermol® products (Cognis Deutschland GmbH & Co. KG), and Soyol®TM products (USSC Co.).

Monofunctional starter compounds that may be employed include alcohols, amines, thiols, and carboxylic acids. Monofunctional alcohols that may be used include: methanol, ethanol, 1-propanol, 2-propanol, 1-butanol, 2-butanol, t-butanol, 3-buten-1-ol, 3-butyn-1-ol, 2-methyl-3-buten-2-ol, 2-methyl-3-butyn-2-ol, propargyl alcohol, 2-methyl-2-propanol, 1-t-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, t-butylamine, pentylamine, hexylamine, aniline, aziridine, pyrrolidine, piperidine, morpholine. Monofunctional thiols that may be used are: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter compounds include dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol, octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol, and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and also all products of modification of these aforementioned alcohols having different amounts of ε-caprolactone. Also employable in mixtures of H-functional starters are trihydric alcohols, for example trimethylolpropane, glycerol, trishydroxyethyl isocyanurate, and castor oil.

The H-functional starter compounds may also be selected from the substance class of the polyether polyols, in particular those having a molecular weight $M_n$ in the range from 100 to 4000 g/mol, preferably 250 to 2000 g/mol. Preference is given to polyether polyols formed from repeat ethylene oxide and propylene oxide units, preferably having a proportion of 35% to 100% of propylene oxide units, particularly preferably having a proportion of 50% to 100% of propylene oxide units. These may be random copolymers, gradient copolymers, alternating copolymers or block copolymers of ethylene oxide and propylene oxide. Suitable polyether polyols constructed from repeating propylene oxide and/or ethylene oxide units are for example the Desmophen®, Acclaim®, Arcol®, Baycoll®, Bayfill®, Bayflex®, Baygal®, PET® and Polyether polyols from Covestro Deutschland AG (e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E products from BASF SE, suitable homopolypropylene oxides are for example the Pluriol® P products from BASF SE, suitable mixed copolymers of ethylene oxide and propylene oxide are for example the Pluronic® PE or Pluriol® RPE products from BASF SE.

The H-functional starter compounds can also be selected from the substance class of the polyester polyols, in particular those having a molecular weight $M_n$ in the range from 200 to 4500 g/mol, preferably from 400 to 2500 g/mol. At least bifunctional polyesters are used as the polyester polyols. Polyester polyols preferably consist of alternating acid and alcohol units. Acid components employed include, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Examples of alcohol components used are ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. Using dihydric or polyhydric polyether polyols as alcohol components gives polyester ether polyols which can likewise serve as starter compounds for producing the polyether carbonate polyols. If polyether polyols are used to produce the polyester ether polyols, preference is given to polyether polyols having a number-average molecular weight $M_n$ of 150 to 2000 g/mol.

Also employable as H-functional starter compounds are polycarbonate polyols (for example polycarbonate diols), especially those having a molecular weight $M_n$ in the range from 150 to 4500 g/mol, preferably 500 to 2500, which are produced for example by reaction of phosgene, dimethyl carbonate, diethyl carbonate or diphenyl carbonate and di- and/or polyfunctional alcohols or polyester polyols or polyether polyols. Examples of polycarbonate polyols may be found in EP 1359177 A1 for example. For example, the polycarbonate diols used may be the Desmophen® C products from Covestro Deutschland AG, for example Desmophen® C 1100 or Desmophen® C 2200.

Likewise employable as H-functional starter compounds are polyether carbonate polyols. Polyether carbonate polyols produced by the process described hereinabove are used in particular. To this end these polyether carbonate polyols used as H-functional starter compounds are produced in a separate reaction step beforehand.

Preferred H-functional starter compounds are alcohols of the general formula (VIII), $$HO-(CH_2)_x-OH \quad \text{(VIII)},$$

wherein x is a number from 1 to 20, preferably an even number from 2 to 20. Examples of alcohols of the formula (VIII) are ethylene glycol, 1,4-butanediol, 1,6-hexanediol, 1,8-octanediol, 1,10-decanediol and 1,12-dodecanediol. Further preferred H-functional starter compounds are neopentyl glycol, trimethylolpropane, glycerol, pentaerythritol, reaction products of the alcohols of formula (VIII) with ε-caprolactone, for example reaction products of trimethylolpropane with ε-caprolactone, reaction products of glycerol with ε-caprolactone, and reaction products of pentaerythritol with ε-caprolactone. Likewise preferably employed as H-functional starter compounds are water, diethylene glycol, dipropylene glycol, castor oil, sorbitol, and polyether polyols constructed from repeating polyalkylene oxide units.

The H-functional starter compounds are particularly preferably one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, diethylene glycol, dipropylene glycol, glycerol, trimethylolpropane, difunctional and trifunctional polyether polyols, where the polyether polyol is formed from a di- or tri-H-functional starter substance and propylene oxide or a di- or tri-H-functional starter substance, propylene oxide, and ethylene oxide. The polyether polyols preferably have a number-average molecular weight $M_n$ in the range from 62 to 4500 g/mol and in particular a number average molecular weight $M_n$ in the range from 62 to 3000 g/mol, very particularly preferably a molecular weight of 62 to 1500 g/mol. The polyether polyols preferably have a functionality of ≥2 to ≤3.

In a preferred embodiment of the invention the polyether carbonate polyol is obtainable by addition of carbon dioxide and alkylene oxides to H-functional starter compounds using multimetal cyanide catalysts (DMC catalysts). The production of polyether carbonate polyols by addition of alkylene oxides and $CO_2$ onto H-functional starter compounds using DMC catalysts is known, for example, from EP-A 0222453, WO-A 2008/013731 and EP-A 2115032.

DMC catalysts are known in principle from the prior art for homopolymerization of epoxides (see, for example, U.S. Pat. Nos. 3,404,109, 3,829,505, 3,941,849, and 5,158,922). DMC catalysts described, for example, in U.S. Pat. No. 5,470,813, EP-A 700 949, EP-A 743 093, EP-A 761 708, WO-A 97/40086, WO-A 98/16310, and WO-A 00/47649 have very high activity in the homopolymerization of epoxides and make it possible to produce polyether polyols and/or polyether carbonate polyols at very low catalyst concentrations (25 ppm or less). A typical example is the highly active DMC catalysts described in EP-A 700 949 which in addition to a double metal cyanide compound (e.g., zinc hexacyanocobaltate (III)) and an organic complex ligand (e.g., t-butanol) contain a polyether having a number-average molecular weight $M_n$ of greater than 500 g/mol.

The DMC catalyst is usually used in an amount of ≤1% by weight, preferably in an amount of ≤0.5% by weight, particularly preferably in an amount of ≤500 ppm and especially in an amount of ≤300 ppm, in each case based on the weight of the polyether carbonate polyol.

Reduction of the volatile constituents by thermal means may be achieved using the methods generally known to those skilled in the art from the prior art. For example the thermal reduction of the volatile constituents may be achieved by thin film evaporation, short-path evaporation or falling film evaporation, this preferably being carried out under reduced pressure (vacuum). It is also possible to employ classical distillation processes where the polyether carbonate polyol is heated to a temperature of from 80° C. to 200° C. in a flask or a stirred tank for example and the volatile constituents are distilled off overhead. The efficiency of the distillation may be enhanced by employing reduced pressure and/or an inert stripping gas (for example nitrogen) and/or an entraining agent (for example water or inert organic solvent). The reduction of the volatile constituents may also be achieved by vacuum stripping in a packed column, steam or nitrogen typically being employed as the stripping gas.

The polyether carbonate polyol preferably has a content of carbonate groups ("units derived from carbon dioxide"), calculated as $CO_2$, of ≥2.0% by weight and ≤30.0% by weight, preferably of ≥5.0% by weight and ≤28.0% by weight and particularly preferably of ≥10.0% by weight and ≤25.0% by weight.

The polyether carbonate polyol(s) preferably has/have a hydroxyl number of ≥20 mg KOH/g to ≤250 mg KOH/g and are obtainable by copolymerization of ≥2.0% by weight to ≤30.0% by weight of carbon dioxide and ≥70% by weight to ≤98% by weight of propylene oxide in the presence of a hydroxy-functional starter molecule, for example trimethylolpropane and/or glycerol and/or propylene glycol and/or sorbitol. The hydroxyl number can be determined according to DIN 53240-1:2013-06.

Preferred polyether carbonate polyols have a molecular weight $M_n$ of 400 to 10 000 g/mol, particularly preferably of 500 to 6000 g/mol.

The number-average $M_n$ and the weight-average $M_w$ molecular weight and the polydispersity ($M_w/M_n$) of the products were determined by gel permeation chromatography (GPC). The procedure of DIN 55672-1 was followed (March 2016): "Gel permeation chromatography, Part 1-Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration.

In a further embodiment, a polyether carbonate polyol containing blocks of formula (IV) is employed, wherein the ratio e/f is from 2:1 to 1:20.

(IV)

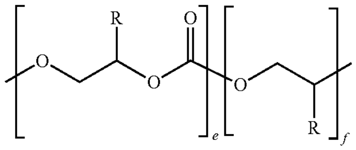

Polyether carbonate polyols having a hydroxyl number according to DIN 53240-1:2013-06 of ≥20 mg KOH/g to ≤120 mg KOH/g are particularly preferred.

It is very particularly preferable when the polyether carbonate polyol also has a $CO_2$ content of 10% to 20% by weight.

Component C

The compositions according to the invention optionally contain one or more heat and/or transesterification stabilizers.

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36). They are used alone or in admixture (for example Irganox® B900 (mixture of Irgafos® 168 and Irganox® 1076 in a 4:1 ratio) or Doverphos® S-9228 PC with Irganox® B900/Irganox® 1076).

Present as transesterification stabilizers are preferably phosphates or sulfonic esters. It is preferable when triisooctyl phosphate is present as a transesterification stabilizer.

The heat stabilizers and/or transesterification stabilizers are preferably employed in an amount up to 1.0% by weight, particularly preferably in a total amount of 0.005% by weight to 0.5% by weight, very particularly preferably 0.01% by weight to 0.2% by weight.

Component D

The compositions according to the invention preferably contain at least one UV absorber as an additive. The UV stabilizers have the lowest possible transmittance below 400 nm and the highest possible transmittance above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF SE, Ludwigshafen), 2-(2'-hydroxy-5'-(tert-octyl)phenyl)benzotriazole (Tinuvin® 329, BASF SE, Ludwigshafen), bis(3-(2H-benzotriazolyl)-2-hydroxy-5-tert-octyl)methane (Tinuvin® 360, BASF SE, Ludwigshafen), 2-(4,6-diphenyl-1,3,5-triazin-2-yl)-5-(hexyloxy)phenol (Tinuvin® 1577, BASF SE, Ludwigshafen), and also benzophenones such as 2,4-dihydroxybenzophenone (Chimassorb® 22, BASF SE, Ludwigshafen) and 2-hydroxy-4-(octyloxy)benzophenone (Chimassorb® 81, BASF SE, Ludwigshafen), 2,2-bis[[(2-cyano-1-oxo-3,3-diphenyl-2-propenyl)oxy]methyl]-1,3-propanediyl ester (9CI) (Uvinul® 3030, BASF SE Ludwigshafen), 2-[2-hydroxy-4-(2-ethylhexyl)oxy]phenyl-4,6-di(4-phenyl)phenyl-1,3,5-triazine (Tinuvin® 1600, BASF SE, Ludwigshafen), tetraethyl-2,2'-(1,4-phenylenedimethylidene) bismalonate (Hostavin® B-Cap, Clariant AG) or N-(2-ethoxyphenyl)-N'-(2-ethylphenyl)ethanediamide (Tinuvin® 312, CAS No. 23949-66-8, BASF SE, Ludwigshafen).

Particularly preferred specific UV stabilizers are Tinuvin® 360, Tinuvin® 329, Tinuvin® 312, Tinuvin® 326 and/or Tinuvin® 1600, with Tinuvin® 329, Tinuvin® 326 and/or Tinuvin® 360 being very particularly preferred.

It is also possible to use mixtures of the abovementioned ultraviolet absorbers.

If UV absorbers are present, the composition preferably contains ultraviolet absorbers in an amount of up to 1.0% by weight, more preferably up to 0.8% by weight, particularly preferably 0.05% by weight to 0.5% by weight, very particularly preferably 0.08% by weight to 0.4% by weight, exceptionally preferably 0.1% by weight to 0.3% by weight, based on the total composition.

Component E

Optionally also present in addition are other customary additives ("further additives") in amounts of up to to 10.0% by weight, more preferably 0.1% by weight to 6.0% by weight, particularly preferably 0.1% by weight to 3.0% by weight, very particularly preferably 0.2% by weight to 1.0% by weight, in particular up to 0.5% by weight, of other customary additives ("further additives"). The group of further additives does not include heat stabilizers and/or transesterification stabilizers or UV absorbers since these have already been described above as components C and D. It will be appreciated that component E does not include polyether carbonate polyol either since this has already been described as component B.

Such additives as are typically added in the case of polycarbonates are described, for example, in EP-A 0 839 623, WO-A 96/15102, EP-A 0 500 496 or "Plastics Additives Handbook", Hans Zweifel, 5th Edition 2000, Hanser Verlag, Munich. The further additives are preferably selected from the group of antioxidants, demolding agents, flame retardants, further stabilizers, IR absorbers, antistats, optical brighteners, colorants such as organic dyes and/or additives for laser marking. These are preferably employed in the amounts customary for polycarbonate. These additives may be added individually or else as mixtures.

The composition may be free from demolding agents, for example (glycerol monostearate) GMS and pentaerythritol tetrastearate (PETS).

The compositions according to the invention particularly preferably employ at least one heat stabilizer and/or transesterification stabilizer (component C) and/or a UV absorber.

It will be appreciated that the employed components may contain typical impurities arising for example from their production process. It is preferable to use the purest possible components. It will further be appreciated that these impurities may also be present in the event of an exhaustive formulation of the composition. The impurities are part of the total weight of the respective component.

Production of the compositions according to the invention containing the components A and B and optionally C and/or optionally D and/or optionally E is effected by commonly used incorporation processes by combination, mixing and homogenization of the individual constituents, wherein in particular the homogenization is preferably carried out in the melt under the influence of shear forces. Combination and mixing is optionally effected prior to melt homogenization using powder pre-mixes.

It is also possible to use premixes of pellets, or of pellets and powders, with components B to optionally E.

It is also possible to use pre-mixes produced from solutions of the mixture components in suitable solvents where homogenization is optionally effected in solution and the solvent is then removed.

In particular, the components B to E of the composition according to the invention may be introduced into the polycarbonate here by known processes or in the form of masterbatch.

The use of masterbatches to incorporate the components B to E, individually or as mixtures, is preferred.

In this connection, the composition according to the invention can be combined, mixed, homogenized and subsequently extruded in customary apparatuses such as screw extruders (ZSK twin-screw extruders for example), kneaders or Brabender or Banbury mills. The extrudate may be cooled and comminuted after extrusion. It is also possible to premix individual components and then to add the remaining starting materials individually and/or likewise mixed.

The combining and mixing of a pre-mix in the melt may also be effected in the plasticizing unit of an injection molding machine. In this case, the melt is directly converted into a molded article in the subsequent step.

The compositions according to the invention can be processed in a customary manner in standard machines, for example in extruders or injection molding machines, to give any molded articles, for example films, sheets or bottles.

Production of the moldings is preferably effected by injection molding, extrusion or from solution in a casting process.

The compositions according to the invention are suitable for producing multilayered systems. This comprises applying the polycarbonate composition in one or more layers atop a molded article made of a plastics material. Application may be carried out at the same time as or immediately after the molding of the molded article, for example by in-mold coating of a film, coextrusion or multicomponent injection molding. However, application can also take place onto the finished molded main body, for example by lamination with a film, insert molding of an existing molded article or by coating from a solution.

The compositions according to the invention are suitable for producing components in the automotive sector, for instance for visors, headlight covers or parts thereof, or frames, lenses and collimators or light guides and for producing transparent frame components in the electricals and electronics (EE) and IT sectors, but especially also part of lighting units, in particular for applications which impose stringent flowability requirements (thin layer applications). Such applications include, for example, components for screens or housings, for instance for ultrabooks or frames for LED display technologies, for example OLED displays or LCD displays or else for E-ink devices. Further applications are transparent housing or cover parts of mobile communication devices, such as smartphones, tablets, ultrabooks, notebooks or laptops, but also satnavs, smartwatches or heart rate meters, and also electrical applications in thin-walled designs, for example home and industrial networking systems and smart meter housing components.

The molded articles and extrudates made of the compositions of the invention and also moldings, extrudates and multilayer systems containing the compositions according to the invention likewise form part of the subject matter of this application.

It is a particular feature of the compositions according to the invention that they exhibit exceptional rheological and optical properties and reduced coefficients of dynamic and static friction on account of their content of polyether carbonate polyol. A further advantage of the compositions of the invention is that it is possible to dispense with any additional demolding agent, for example PETS (pentaerythritol tetrastearate).

These additives frequently lower the thermal properties. Therefore, the composition of the invention preferably does not comprise any pentaerythritol tetrastearate. The present invention further provides for the use of polyether carbonate polyol, in particular of one or more of those previously described, for improving transmittance Ty and/or for reducing the coefficients of dynamic and static friction of compositions comprising aromatic polycarbonate (component A), optionally heat stabilizer and/or transesterification stabilizer (component C) and optionally further additives (component D), wherein transmittance Ty is determinable for example according to ISO 13468-2:2006 at 4 mm in thickness and the coefficients of dynamic and static friction are determinable using injection molded disks according to the method described in EP 1 377 812 B1.

The embodiments described hereinabove for the compositions according to the invention also apply—where applicable—to the uses according to the invention.

The examples which follow are intended to illustrate the invention but without limiting said invention.

EXAMPLES

1. Description of Raw Materials and Test Methods

The polycarbonate compositions described in the following examples were produced on a Berstorff ZE 25 extruder at a throughput of 10 kg/h by compounding. The melt temperature was 275° C.

Component A-1: Linear polycarbonate based on bisphenol A having a melt volume-flow rate MVR of 9.0 $cm^3$/(10 min) (according to ISO 1133:2012-03, at a test temperature of 300° C. and under a load of 1.2 kg).

Component A-2: Linear polycarbonate based on bisphenol A in powder form having a melt volume-flow rate MVR of 6.0 $cm^3$/(10 min) (according to ISO 1133:2012-03, at a test temperature of 300° C. and under a load of 1.2 kg).

Component B-1: Polyether carbonate polyol, functionality: 2.82; hydroxyl number according to DIN 53240-1:2013-

06: 54 mg KOH/g, 14% by weight $CO_2$ content, produced by copolymerization of propylene oxide and carbon dioxide with glycerol and propylene glycol as H-functional starter compounds in the presence of a double metal cyanide catalyst.

Component B-2: Polyether carbonate polyol, functionality: 2.0; hydroxyl number according to DIN 53240-1:2013-06: 56 mg KOH/g, 19% by weight $CO_2$ content, produced by copolymerization of propylene oxide and carbon dioxide with propylene glycol as H-functional starter compound in the presence of a double metal cyanide catalyst.

Component B-3: Polyether carbonate polyol, functionality: 2.82; hydroxyl number according to DIN 53240-1:2013-06: 170 mg KOH/g, 12% by weight $CO_2$ content, produced by copolymerization of propylene oxide and carbon dioxide with glycerol and propylene glycol as H-functional starter compounds in the presence of a double metal cyanide catalyst.

Component C-1: Heat stabilizer, triphenylphosphine from BASF.

Component C-2: Transesterification inhibitor, triisooctyl phosphate (TOF) from Lanxess AG.

Component D: UV absorber, Tinuvin 329 from BASF.

$CO_2$ Content in Polyether Carbonate Polyol:

The proportion of incorporated $CO_2$ in the resulting polyether carbonate polyol was determined by $^1$H-NMR (Bruker DPX 400, 400 MHz; pulse programme zg30, relaxation delay dl: 10 s, 64 scans) as specified in the general description.

As a measure of heat resistance the Vicat softening temperature VST/B50 was determined according to ISO 306:2013 on test specimens measuring 80 mm×10 mm×4 mm with a piston load of 50 N and a heating rate of 50° C./h or 120° C./h using a Coesfeld Eco 2920 instrument from Coesfeld Materialtest.

Melt volume flow rate (MVR) was determined according to ISO 1133:2012-03 (at a testing temperature of 300° C., mass 1.2 kg or 2.16 kg) using a Zwick 4106 instrument from Zwick Roell. MVR was also measured after a preheating time of 20 minutes (IMVR20'). This is a measure of melt stability under elevated thermal stress.

Yellowness index (Y.I.) was determined according to ASTM E 313-10 (observer: 10°/light type: D65) on specimen plaques having a layer thickness of 4 mm.

The transmittance Ty in the VIS range of the spectrum (visual transmittance, D65, 100 observation) was determined according to ISO 13468-2:2006 on specimen plaques having a layer thickness of 4 mm or 12 mm.

Haze was determined according to ASTM D1003:2013 on specimen plaques having a layer thickness of 4 mm or 12 mm.

The coefficients of dynamic and static friction were determined using a modified Arburg-370S-800-150 injection molding machine. The method is described in EP 1 377 812 B1. Static friction is the coefficient of friction derived from the force required to set bodies (pistons/test specimens) at rest relative to one another into motion (threshold value). Dynamic friction is correspondingly derived from the constant force necessary to ensure uniform continuation of the motion.

The coefficient of friction is defined as follows: FR=μ×FN or, rearranging for μ, μ=FR/FN (FN=normal force, FR=frictional force, ρ=coefficient of friction).

In the case of circular motion the following relationship applies: FR=Md/rm (Md=torque, rm=average radius of the friction surface (ring surface)) and Md/rm=μ×FN and, rearranging for μ, μ=Md/(rm×FN).

A disk-shaped test specimen having an outer diameter of 92 mm and a thickness of 2.6 mm was produced in a coefficient of friction mold. Said specimen had at its outer edge a 5 mm high and 3 mm wide strip on which were arranged shallow depressions, comparable to a toothed belt pulley, by means of which the torque is transferred from the mold to the test specimen.

This allows direct determination of the coefficient of static friction and the coefficient of dynamic friction using a disk-shaped test specimen immediately prior to demoulding. In this case, the frictional force is proportional to the torque. Upon opening of the mold a piston connected to a torque sensor pushes against the molding (friction partner) with a defined normal force FN. On the other side of the molding the test specimen is held and set into rotation. The torque measured at the piston is used to determine the coefficient of static friction and the coefficient of dynamic friction between the piston and the test specimen. Since the friction is caused by the unevenness of the surfaces sliding against one another (snagging) the piston was configured to have an average surface roughness Ra=0.05 μm.

In an injection molding machine the materials were melted and at a melt temperature of 300° C. injected into the closed coefficient of friction mold at a mold wall temperature of 90° C. and held for 15 s at a holding pressure of 400 bar. After a residual cooling time of 17 s the mold was opened slightly and the coefficients of static and dynamic friction were determined.

The sample placques were each produced by injection molding at a melt temperature of 300° C. and a mold wall temperature of 90° C.

TABLE 1

| Tabelle 1 | V1 | 2 | 3 | 4 | 5 | 6 | 7 | 8 | 9 | 10 | 11 | 12 |
|---|---|---|---|---|---|---|---|---|---|---|---|---|
| A1 | 85 | 85 | 85 | 85 | 85 | 85 | 85 | 85 | 85 | 85 | 85 | 85 |
| A2 | 15 | 14.9 | 14.6 | 14.35 | 14.9 | 14.8 | 14.6 | 14.35 | 14.9 | 14.8 | 14.6 | 14.35 |
| B1 | | 0.1 | 0.4 | 0.65 | | | | | | | | |
| B2 | | | | | 0.1 | 0.2 | 0.4 | 0.65 | | | | |
| B3 | | | | | | | | | 0.1 | 0.2 | 0.4 | 0.65 |
| Test | | | | | | | | | | | | |
| MVR 300° C./1.2 kg | 9.2 | 9.5 | 9.7 | 10.6 | 9.4 | 9.4 | 9.4 | 10.9 | 9.4 | 9.6 | 10.4 | 11.0 |
| IMVR20' 300° C./1.2 kg | 9.2 | 10.2 | 10.9 | 14.1 | 9.9 | 9.9 | 10.2 | 12.6 | 10.1 | 10.6 | 12.0 | 14.1 |

TABLE 1-continued

| Tabelle 1 | V1 | 2 | 3 | 4 | 5 | 6 | 7 | 8 | 9 | 10 | 11 | 12 |
|---|---|---|---|---|---|---|---|---|---|---|---|---|
| DMVR/IMVR20' | 0.0 | 0.7 | 1.2 | 3.5 | 0.5 | 0.5 | 0.8 | 1.7 | 0.7 | 1.0 | 1.6 | 3.1 |
| Vicat VST B50 | 145.3 | 144.4 | 142.9 | 141.3 | 145.0 | 144.9 | 143.4 | 140.7 | 144.8 | 143.8 | 142.8 | 140.4 |
| IZOD notched impact strength ISO7391/180A 3 mm | | | | | | | | | | | | |
| 23° C. | 73z | 72z | 72z | 70z | 71z | 71z | 70z | 68z | 70z | 72z | 70z | 71z |
| Optical data 300° C./80° C. | | | | | | | | | | | | |
| Transmittance | 88.8 | 89.1 | 89.2 | 89.5 | 88.9 | 89.0 | 89.1 | 89.2 | 89.0 | 89.1 | 89.3 | 89.4 |
| Yellowness index | 3.8 | 3.3 | 3.1 | 2.2 | 3.9 | 3.5 | 3.7 | 2.9 | 3.8 | 3.1 | 2.8 | 2.6 |
| Haze | 0.9 | 0.5 | 0.4 | 0.4 | 0.4 | 0.4 | 0.3 | 0.5 | 0.4 | 0.4 | 0.4 | 0.3 |
| Coefficient of friction | | | | | | | | | | | | |
| Static friction | 0.60 | 0.46 | 0.3 | 0.26 | 0.52 | 0.54 | 0.43 | 0.32 | 0.61 | 0.52 | 0.44 | 0.34 |
| Dynamic friction | 0.62 | 0.49 | 0.36 | 0.32 | 0.55 | 0.55 | 0.49 | 0.39 | 0.59 | 0.55 | 0.51 | 0.42 |

The inventive compositions exhibit ever higher transmittance with increasing proportion of polyether carbonate polyol (comparative example V1 compared to inventive examples 2 to 4, 5 to 8 and 9 to 12). At the same time yellowness index and haze are reduced. It is also apparent that the coefficients of friction (static friction, dynamic friction) are reduced by the addition of polyether carbonate polyol, i.e. the demolding characteristics are improved. The polyether carbonate polyols also bring about an improvement in flowability. The heat resistance is virtually unchanged in the case of the above compositions despite the addition of polyether carbonate polyol.

TABLE 2

| | | V13 | 14 | 15 | 16 | 17 | 18 | 19 |
|---|---|---|---|---|---|---|---|---|
| Al | [% by wt.] | 85 | 85 | 85 | 85 | 85 | 85 | 85 |
| A2 | [% by wt.] | 15 | 14.2 | 13.8 | 14.2 | 13.8 | 14.2 | 13.8 |
| B1 | [% by wt.] | | 0.8 | 1.2 | | | | |
| B2 | [% by wt.] | | | | 0.8 | 1.2 | | |
| B3 | [% by wt.] | | | | | | 0.8 | 1.2 |
| Test | | | | | | | | |
| MVR 300° C./1.2 kg | [$cm^3$/(10 min)] | 9.1 | 10.5 | 11.5 | 10.6 | 12.2 | 11.5 | 12.6 |
| IMVR20' 300° C./1.2 kg | [$cm^3$/(10 min)] | 9.3 | 12.8 | 12.9 | 15.5 | 15.9 | 14.3 | 14.8 |
| DMVR/IMVR20' | | 0.2 | 2.3 | 1.4 | 4.9 | 3.7 | 2.8 | 2.2 |
| Vicat VST B50 | [° C.] | 144.5 | 139.7 | 137.1 | 139.6 | 137.1 | 139.0 | 136.8 |
| Optical data 300° C./80° C. | | | | | | | | |
| transmittance | [%] | 88.74 | 89.07 | 89.12 | 89.29 | 89.47 | 89.45 | 89.5 |
| Yellowness index | | 3.68 | 2.17 | 2.14 | 2.71 | 2.29 | 2.48 | 2.33 |
| Haze | [%] | 1.72 | 1.71 | 1.6 | 1.29 | 0.69 | 0.48 | 0.49 |

Larger amounts of polyether carbonate polyol bring about a gradual reduction in heat resistance; however at an amount of 1.2% by weight of polyether carbonate polyol heat resistance remains adequate. Compared to comparative experiment V13 it is apparent that the inventive compositions exhibit an improvement in flowability, an increase in transmittance and a reduction in Y.I. values and also haze as a result of the addition of polyether carbonate polyol.

TABLE 3

| | | V20 | V21 | 22 | V23 | 24 | 25 |
|---|---|---|---|---|---|---|---|
| A1 | [% by wt.] | 93 | 93 | 93 | 93 | 93 | 93 |
| A2 | [% by wt.] | 7 | 6.975 | 6.575 | 6.99 | 6.79 | 6.59 |

TABLE 3-continued

| | | V20 | V21 | 22 | V23 | 24 | 25 |
|---|---|---|---|---|---|---|---|
| B2 | [% by wt.] | | | 0.4 | | 0.2 | 0.4 |
| C1 | [% by wt.] | | 0.025 | 0.025 | | | |
| C2 | [% by wt.] | | | | 0.01 | 0.01 | 0.01 |
| Test | | | | | | | |
| MVR | [$cm^3$/(10 min)] | 9.4 | 9.4 | 10.3 | 9.3 | 9.9 | 10.0 |
| IMVR20' 300° C./1.2 kg | [$cm^3$/(10 min)] | 9.5 | 9.6 | 12.0 | 9.5 | 10.3 | 12.0 |
| DMVR/IMVR20' | | 0.1 | 0.2 | 1.7 | 0.2 | 0.4 | 2.0 |
| Vicat VST B50 | [° C.] | 146.2 | 145.2 | 143.7 | 146.0 | 144.6 | 143.6 |
| Optical data | | | | | | | |
| Sample thickness (ro) | | 4 | 4 | 4 | 4 | 4 | 4 |
| L* (ro) | | 95.63 | 95.8 | 95.83 | 95.6 | 95.72 | 95.75 |
| a* (ro) | | −0.27 | −0.07 | −0.09 | −0.27 | −0.22 | −0.23 |
| b* (ro) | | 1.81 | 0.88 | 0.85 | 1.85 | 1.47 | 1.47 |
| Transmittance (ro) | [%] | 89.12 | 89.52 | 89.59 | 89.05 | 89.34 | 89.41 |
| Yellowness index (ro) | | 3.23 | 1.6 | 1.53 | 3.3 | 2.62 | 2.61 |
| Haze (ro) | [%] | 0.46 | 0.57 | 0.43 | 0.5 | 0.43 | 0.4 |

The abovementioned effects are also apparent for compositions containing heat stabilizer/transesterification stabilizer (component C1/component C2).

TABLE 4

| | | V26 | V27 | 28 | 29 |
|---|---|---|---|---|---|
| A1 | [% by wt.] | 93.0 | 93.0 | 93.0 | 93.0 |
| A2 | [% by wt.] | 7.0 | 6.8 | 6.6 | 6.4 |
| B3 | [% by wt.] | | | 0.2 | 0.4 |
| D | [% by wt.] | | 0.2 | 0.2 | 0.2 |
| Test | | | | | |
| MVR | [$cm^3$/(10 min)] | 9.4 | 9.9 | 10.3 | 12.6 |
| IMVR20' 300° C./1.2 kg | [$cm^3$/(10 min)] | 9.5 | 10 | 11.1 | 14.5 |
| DMVR/IMVR20' | | 0.1 | 0.1 | 0.8 | 1.9 |
| Vicat VST B50 | [° C.] | 146.3 | 145 | 143.9 | 140.2 |
| Optical data | | | | | |
| Sample thickness (ro) | | 4 | 4 | 4 | 4 |
| L* (ro) | | 95.6 | 95.37 | 95.65 | 95.58 |
| a* (ro) | | −0.25 | −0.41 | −0.39 | −0.43 |
| b* (ro) | | 1.78 | 2.32 | 1.97 | 2.03 |
| Transmittance (ro) | [%] | 89.04 | 88.51 | 89.16 | 89.00 |
| Yellowness index (ro) | | 3.17 | 4.08 | 3.42 | 3.52 |
| Haze (ro) | [%] | 0.49 | 1.19 | 0.44 | 0.69 |

As expected, the addition of UV absorbers brings about an increase in the Y.I. value due to their inherent color. However, a reduction in the Y.I. value is achievable here too by addition of polyether carbonate polyol.

The invention claimed is:

1. A transparent thermoplastic composition containing
A) aromatic polycarbonate, and
B) polyether carbonate polyol,
C) optionally at least one heat stabilizer and/or transesterification stabilizer,
D) optionally at least one UV absorber, and
E) optionally one or more further additives distinct from components B, C and D,
wherein "transparent" means a visual transmittance Ty (D65 observed at) 10° of at least 84%, determined according to ISO 13468-2:2006 at a thickness of 4 mm, and a haze of <5%, determined according to ASTM D1003:2013 at a layer thickness of 4 mm.

2. The thermoplastic composition as claimed in claim 1 containing:
A) 70.0% by weight to 99.95% by weight of the aromatic polycarbonate, and
B) 0.05% to 2.0% by weight of the polyether carbonate polyol.

3. The transparent thermoplastic composition as claimed in claim 1, wherein the composition contains:
A) 80.0% to 99.9% by weight of the aromatic polycarbonate and
B) 0.1% to 1.2% by weight of the polyether carbonate polyol,
C) 0% to 1.0% by weight of the at least one heat stabilizer and/or transesterification stabilizer,
D) 0% to 1.0% by weight of the at least one UV absorber, and
E) optionally the one or more further additives distinct from components B, C and D.

4. The transparent thermoplastic composition as claimed in claim 1, wherein the composition contains at least 0.2% by weight of the polyether carbonate polyol.

5. The transparent thermoplastic composition as claimed in claim 1 containing the at least one UV absorber as component D.

6. The transparent thermoplastic composition as claimed in claim 1, consisting of the components A, B, optionally C, optionally D, optionally E and optionally blend partners.

7. The transparent thermoplastic composition as claimed in claim 1, consisting of:
A) 95.0% to 99.9% by weight of the aromatic polycarbonate, and
B) 0.1% to 1.2% by weight of the polyether carbonate polyol,
C) 0% to 1.0% by weight of the at least one heat stabilizer and/or transesterification stabilizer,
D) 0% to 1.0% by weight of the at least one UV absorber, and
E) optionally the one or more further additives, wherein the further additives are selected from the group consisting of antioxidants, demolding agents, flame retardants, IR absorbers, antistats, optical brighteners, colorants, and/or additives for laser marking.

8. The transparent thermoplastic composition as claimed in claim 1, wherein the polyether carbonate polyol present has a hydroxyl number according to DIN 53240-1:2013-06 of ≥20 mg KOH/g to ≤120 mg KOH/g.

9. The transparent thermoplastic composition as claimed in claim 1, wherein the polyether carbonate polyol present is exclusively one having a hydroxyl number according to DIN 53240-1:2013-06 of ≥20 mg KOH/g to ≤120 mg KOH/g and/or a $CO_2$ content of 10% to 25% by weight.

10. The transparent thermoplastic composition as claimed in claim 1, wherein the polyether carbonate polyol has a hydroxyl number of ≥20 mg KOH/g to ≤250 mg KOH/g determined according to DIN 532401:2013-06 and is obtainable by copolymerization of ≥2.0% to ≤30.0% by weight of carbon dioxide and ≥70% to ≤98% by weight of propylene oxide in the presence of a hydroxy-functional starter molecule.

11. The transparent thermoplastic composition as claimed in claim 1, wherein the polyether carbonate polyol contains blocks according to formula (IV), wherein R is an organic radical, wherein e and f are each an integer, and wherein a ratio e/f is from 2:1 to 1:20, (IV)

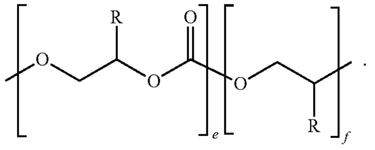

12. A molding produced from a transparent thermoplastic composition as claimed in claim 1.

13. The molding as claimed in claim 12, wherein the molding is part of a headlight cover or a headlight cover, part of a display, part of a lighting unit, or a lens.

14. A method to improve the transmittance in the VIS range of a transparent thermoplastic composition comprising forming the transparent thermoplastic composition as claimed in claim 1.

15. The method as claimed in claim 14, wherein the polyether carbonate polyol has a hydroxyl number according to DIN 53240-1:2013-06 of ≥20 mg KOH/g to ≤120 mg KOH/g and/or a $CO_2$ content of 10% to 25% by weight.

16. The transparent thermoplastic composition as claimed in 7, wherein the colorants comprise an organic dye.

17. The transparent thermoplastic composition of claim 1, wherein the polyether carbonate polyol of component B) has a molecular weight Mn of 400 to 10 000 g/mol.

18. The transparent thermoplastic composition of claim 1, wherein the polyether carbonate polyol of component B) has a molecular weight Mn of 500 to 6000 g/mol.

19. The transparent thermoplastic composition of claim 11, wherein the organic radical is alkyl, alkylaryl or aryl.

* * * * *